F. B. MARTIN.
CARTON FILLING AND SEALING MACHINE.
APPLICATION FILED DEC. 19, 1914.
1,198,740.
Patented Sept. 19, 1916.
9 SHEETS—SHEET 5.
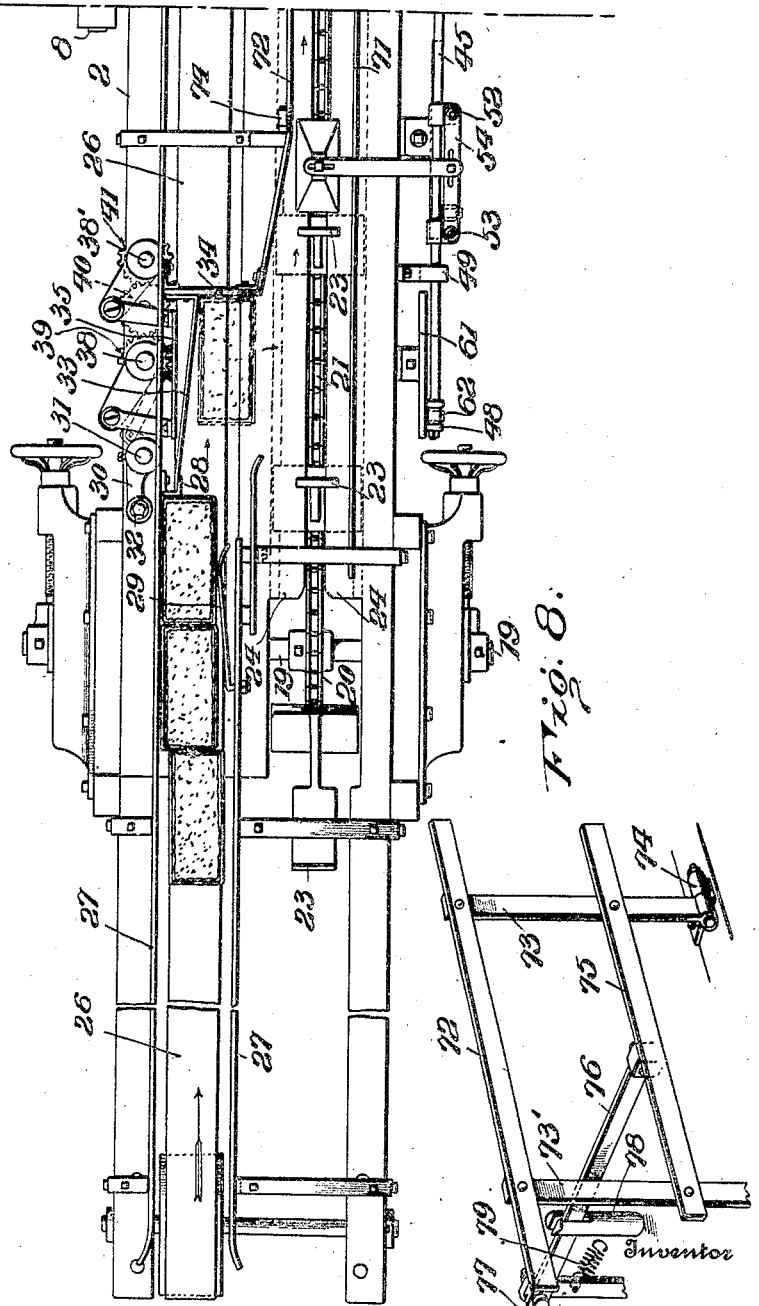

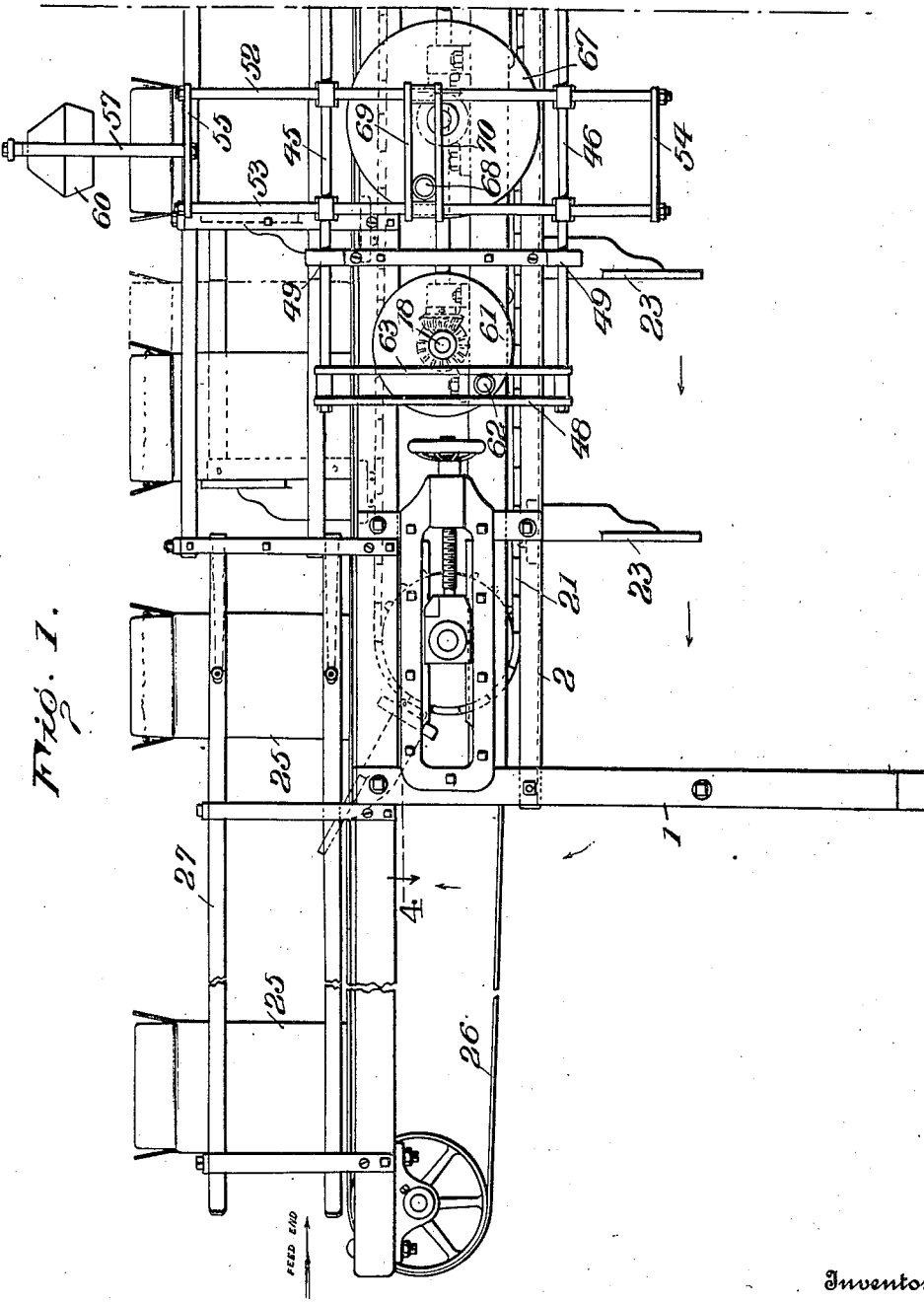

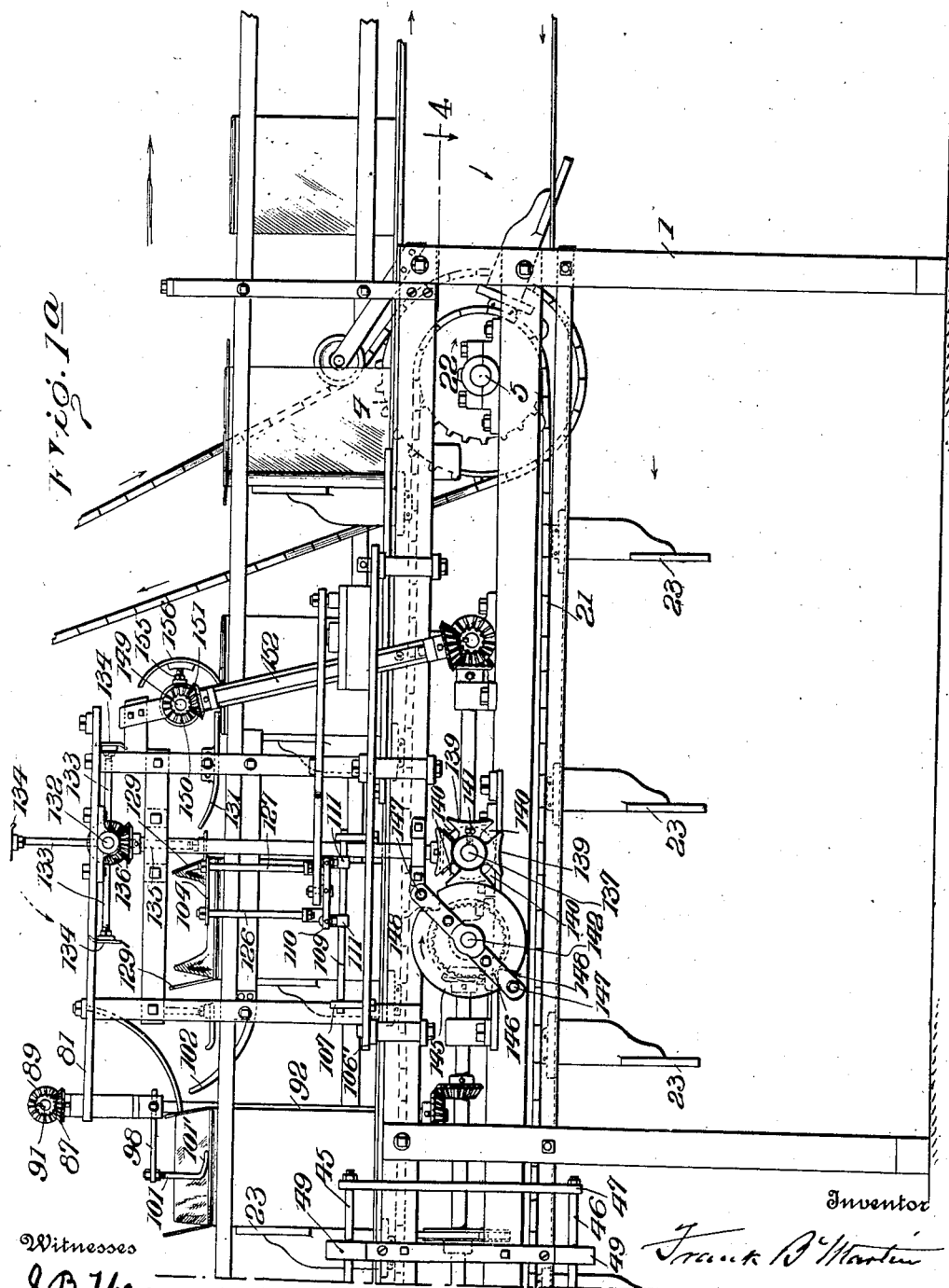

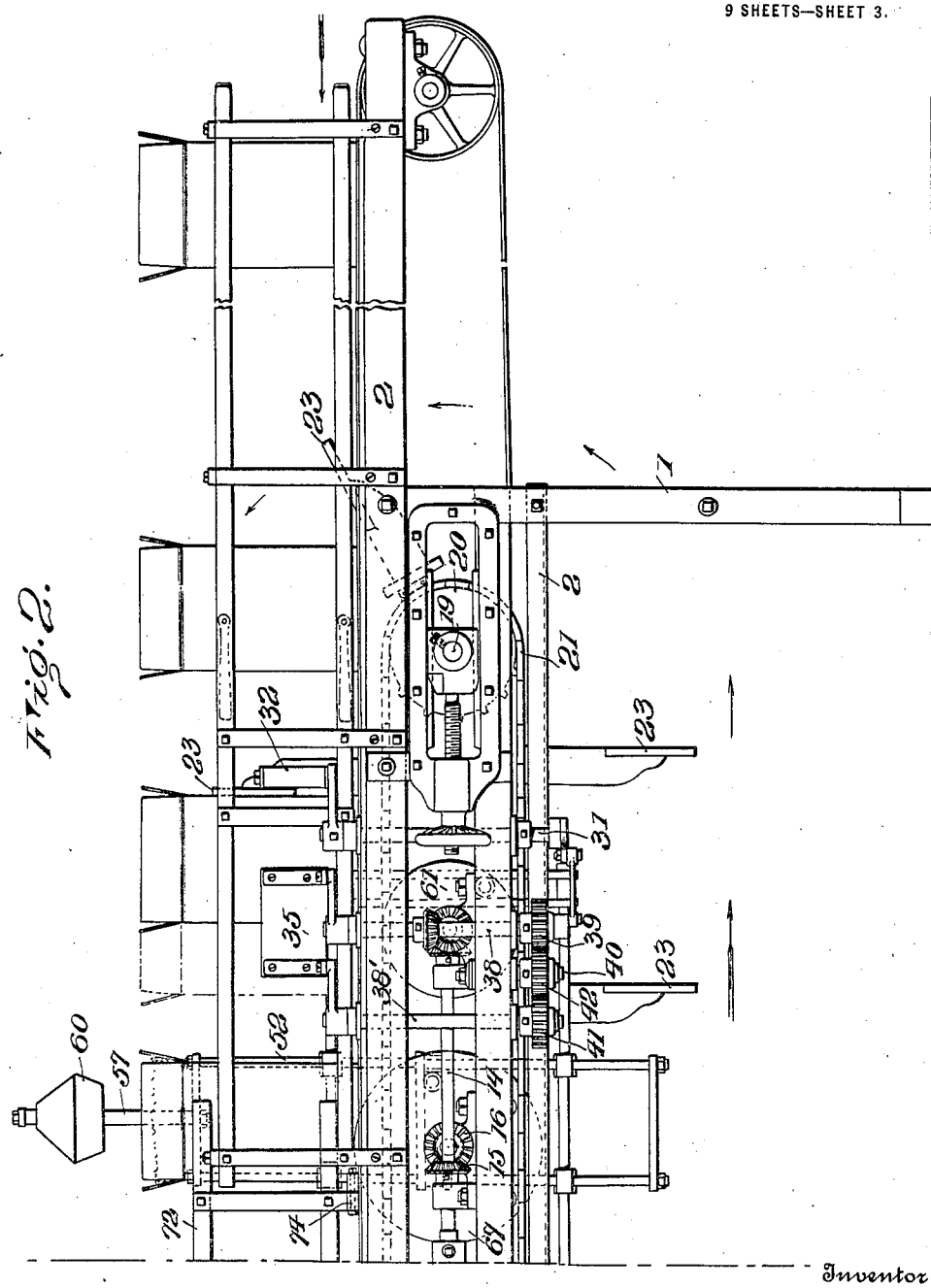

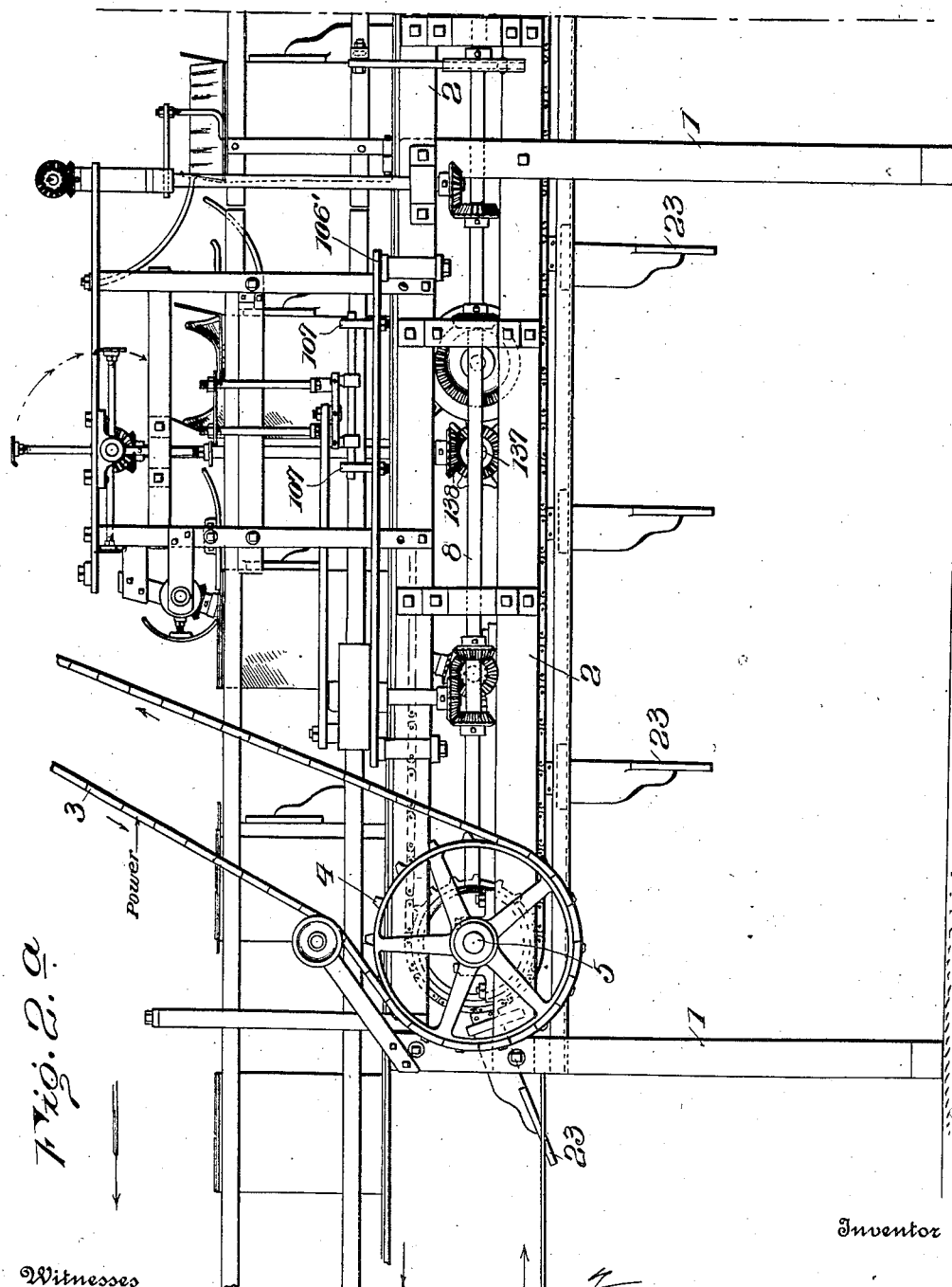

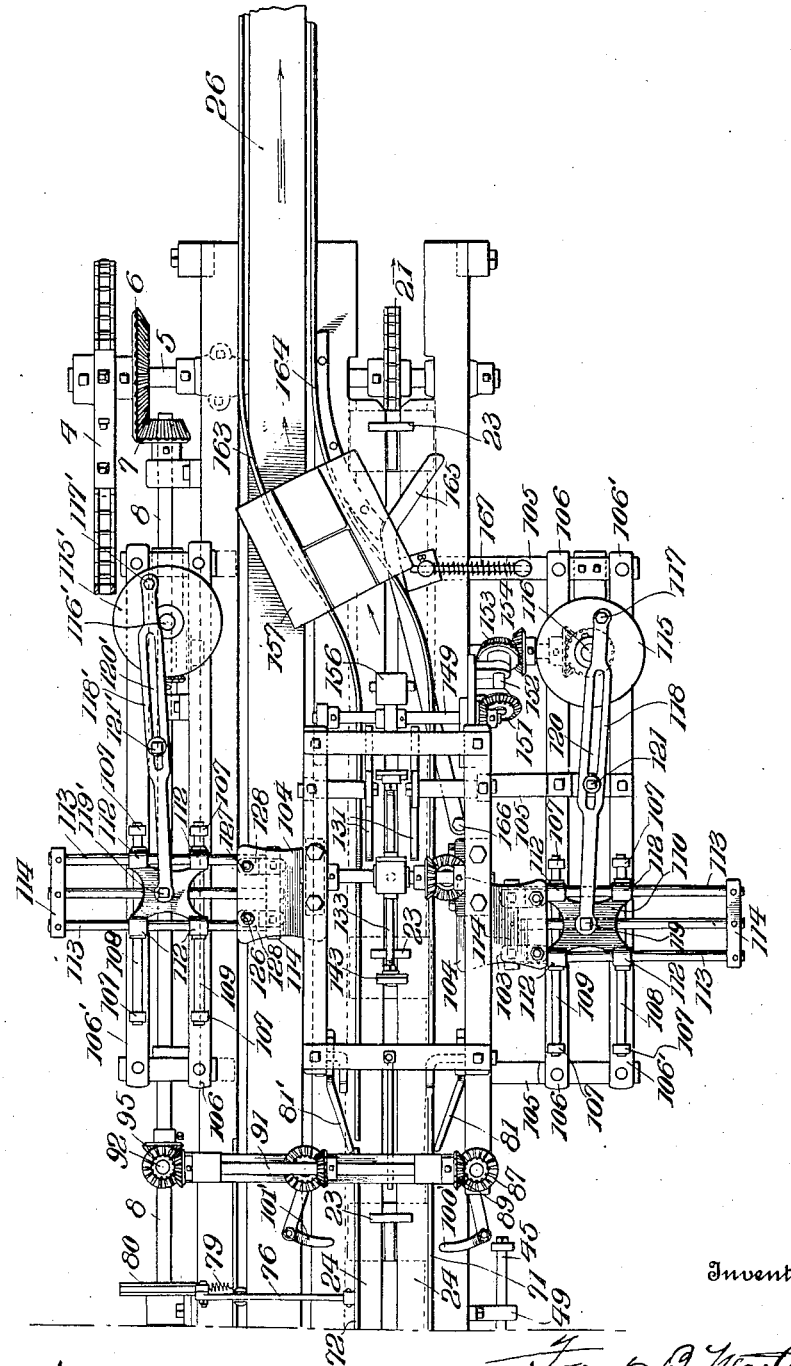

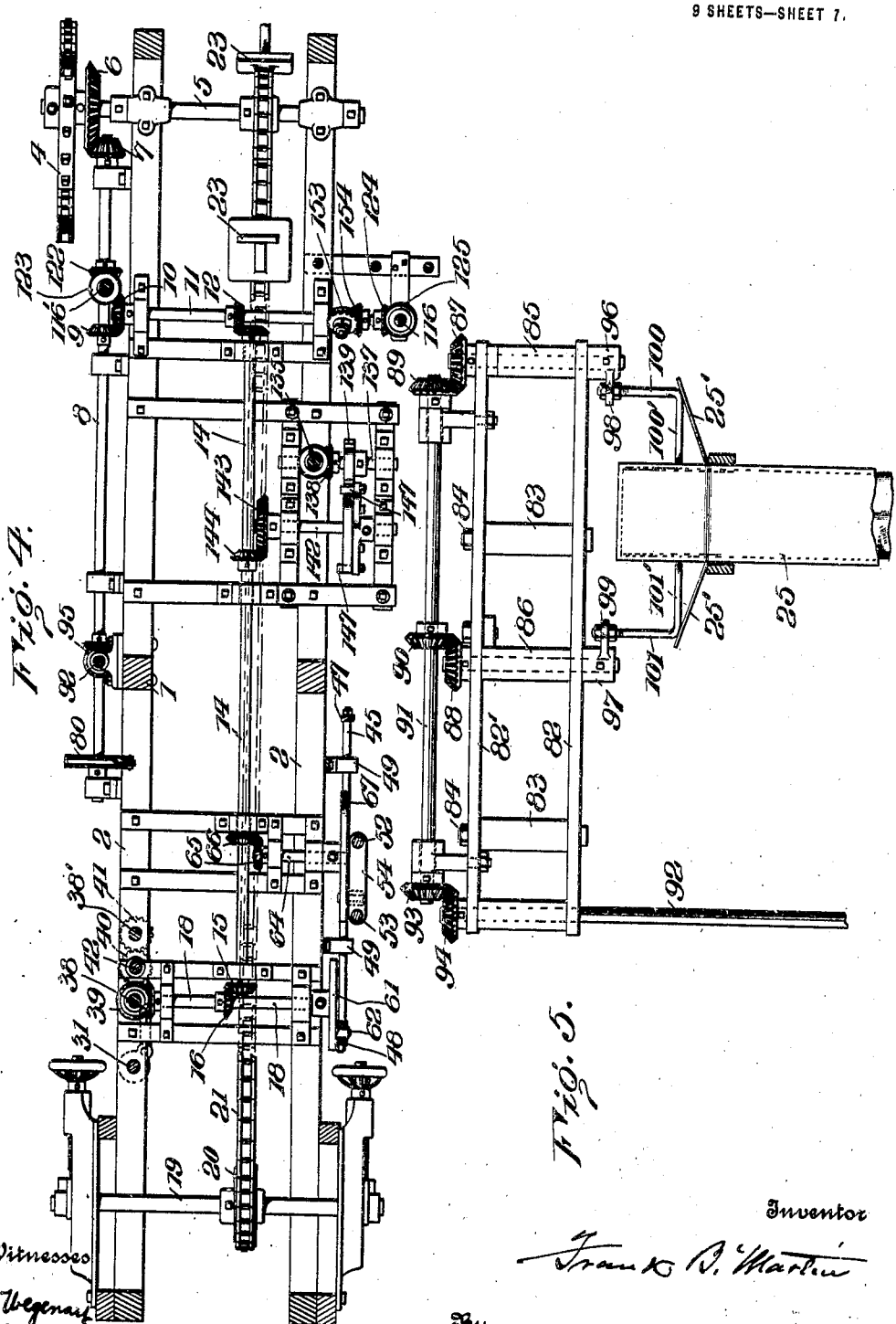

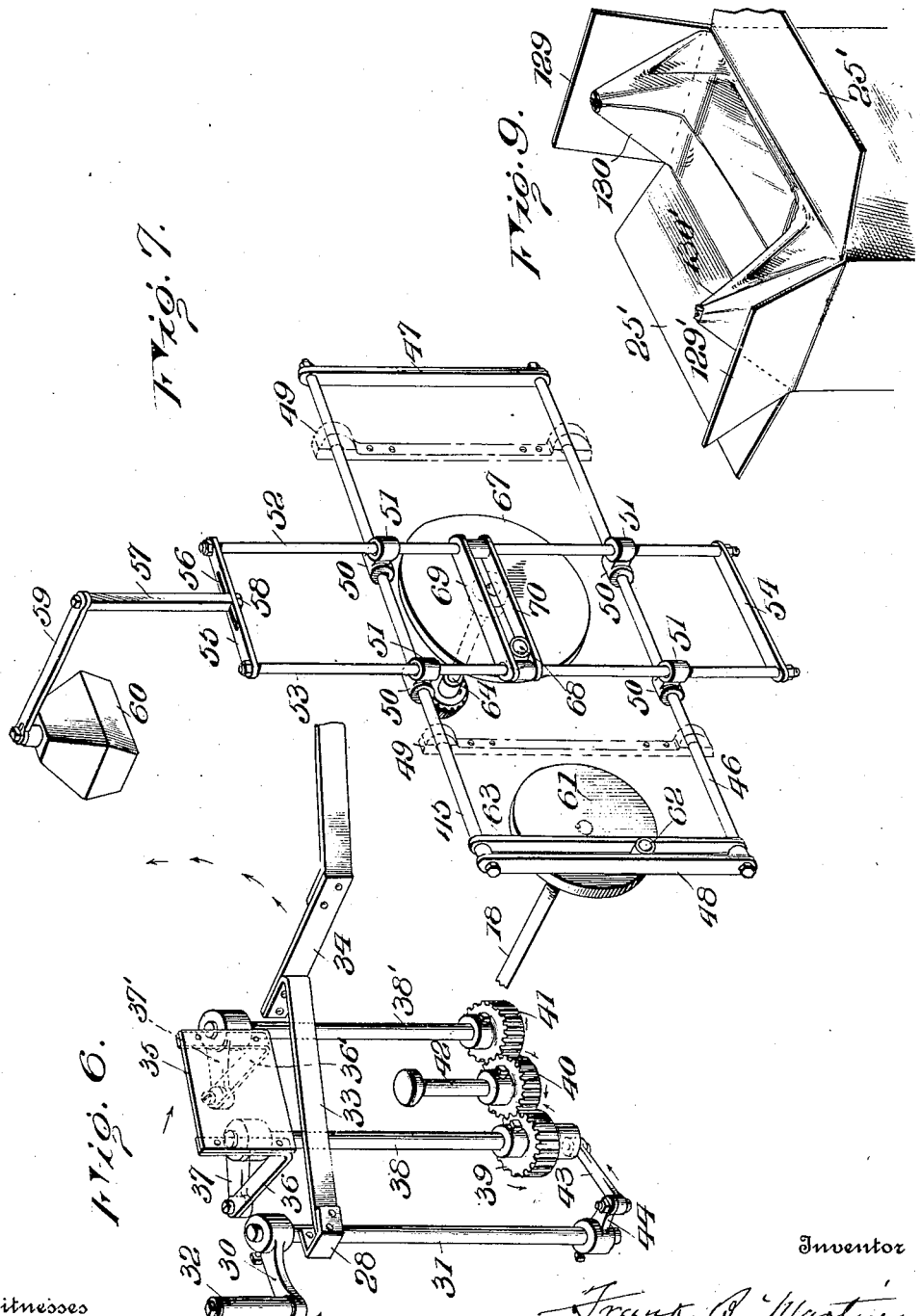

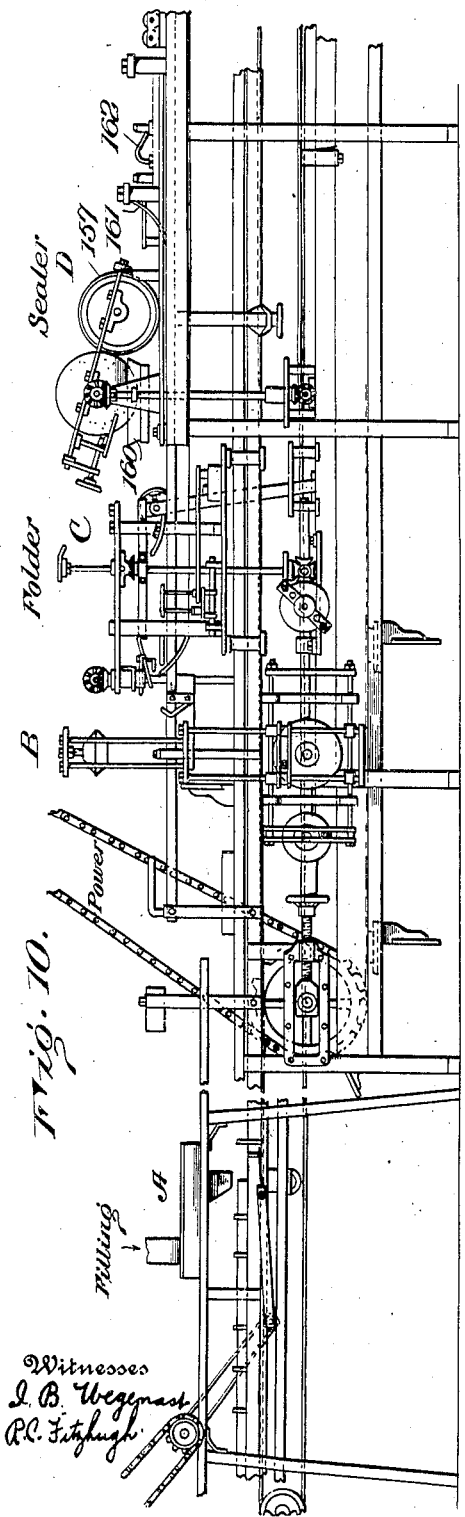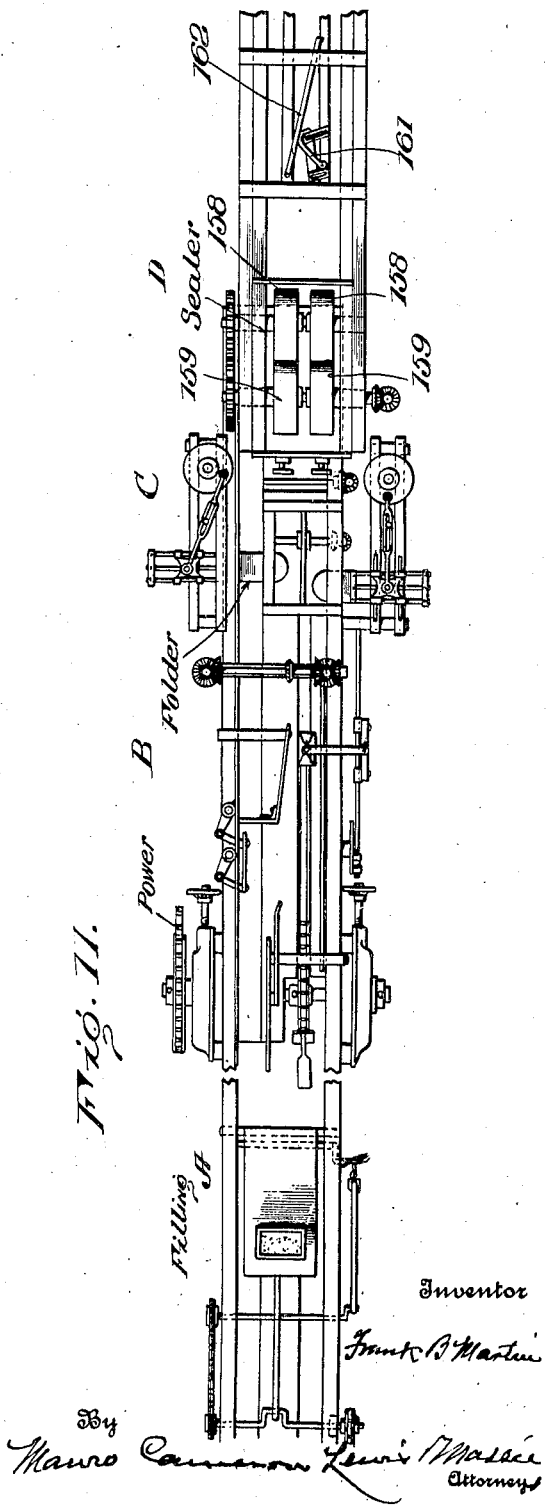

UNITED STATES PATENT OFFICE.

FRANK B. MARTIN, OF BATTLE CREEK, MICHIGAN, ASSIGNOR TO POSTUM CEREAL CO., LTD., OF BATTLE CREEK, MICHIGAN, A PARTNERSHIP ASSOCIATION, LIMITED, OF MICHIGAN.

CARTON FILLING AND SEALING MACHINE.

1,198,740.      Specification of Letters Patent.      Patented Sept. 19, 1916.

Application filed December 19, 1914. Serial No. 878,083.

*To all whom it may concern:*

Be it known that I, FRANK B. MARTIN, a citizen of the United States of America, and a resident of Battle Creek, Michigan, have invented a new and useful Improvement in Carton Filling and Sealing Machines, which invention is fully set forth in the following specification.

This invention relates to carton filling and sealing machines, and more particularly to machines designed to effect these functions with cartons provided with a lining in the shape of a paper bag or other suitable form. In machines of this class as heretofore constructed, a suitable paper lining, such, for example, as a paper bag, has been inserted within the carton, and after the same has been filled with the material, the paper bag or other lining has been folded down by hand into a proper position to enable a carton-sealing mechanism to effect the closure of the carton by gluing the top flaps thereof.

The present invention has for its object to provide means whereby all of the operations, from the filling to the sealing of the cartons, shall be performed mechanically.

With this object in view, the invention, generally stated, consists in providing a suitable carrier or other advancing means to carry the cartons with the bags therein past the carton-filling mechanism, by which they are filled with the material, and then past suitable mechanism for mechanically folding in the upwardly projecting portions of the bag or paper lining, and from thence to the carton-sealing mechanism, whereby the glue is applied to the flaps of the cartons, and they are folded over and effectually sealed.

The bag or other paper lining must be folded approximately on a level with the top of the carton, in order that the carton flaps may be readily turned into position to effect the sealing operation, and when the cartons are filled with certain kinds of light material, it is liable to protrude or be piled up in the carton above the top line thereof in such a way as to interfere with the proper folding of the paper bag or other lining, and according to the present invention, means are provided for pressing the contents of the carton downward therein to a plane below the level of the top of the carton. Furthermore, according to the present invention, means are provided, in connection with the bag-folding mechanism, for opening out the side flaps of the cartons, so that the same shall not interfere with the bag-folding operation, and for retaining these flaps in their open position for the application of glue by the sealing mechanism. The bag-folding mechanism is so combined with the sealing mechanism that the means which are employed for folding down the end flaps of the cartons in the sealing operation also perform a part of the bag-folding steps.

Any suitable or well-known form of carton-filling mechanism may be employed, and likewise any suitable or well-known form of carton-sealing mechanism may be used, since the present invention does not reside in the specific or particular forms of these mechanisms which are employed, but resides rather in mechanism which I have devised for effecting the bag-folding operation, and in the combination of such mechanism with the carton-filling and carton-sealing mechanisms.

The several sets of mechanisms, that is to say, the carton-filling, the bag-folding and the carton-sealing mechanisms, may be, and preferably are, arranged in such manner that the cartons are fed in a straight line past the several sets of mechanisms, but, if desired, the bag-folding mechanism may be, and sometimes is, placed to one side of the carton-filling and carton-sealing mechanisms, and the cartons shifted from the direct line past these mechanisms into a channel passing by the bag-folding mechanism, and when the folding operation is completed, is again shifted into the straight line channel, and directed past the sealing devices.

The inventive idea involved is capable of receiving a variety of mechanical expressions, some of which, for the sake of illustrating the invention, are shown in the accompanying drawings, but it is to be understood that such drawings are for the purpose of illustrating the invention only, and are not designed to define the limits thereof, reference being had to the claims for this purpose.

In the drawings—Figures 1 and 1ª, taken together, show a side elevation of the machine, and Figs. 2 and 2ª show a side elevation of the opposite side from that shown in Figs. 1 and 1ᵃ; Figs. 3 and 3ᵃ together constitute a top plan view of the bag-folding mechanism, showing, in Fig. 3, the means for shifting the cartons from a carrier into the folding mechanism, and in Fig. 3ᵃ the means for shifting the cartons after the bags have been folded back onto the carrier; Fig. 4 is a transverse horizontal section taken on the line 4—4 of combined Figs. 1 and 1ᵃ; Fig. 5 is a broken elevational detail illustrating the means for opening the side flaps of the cartons in advance of the bag-folding operation; Fig. 6 is a perspective detail illustrating the means for shifting the cartons from the feeding belt into the bag-folding mechanism, as shown in Fig. 3; Fig. 7 is a like perspective detail of the means for compressing material in the cartons; Fig. 8 is a perspective detail of the means for straightening up the sides of the cartons to prevent bulging; Fig. 9 is a perspective view of the top of the carton showing the side flaps open, the sides of the bag or lining folded in, and the end flaps of the carton and the end portions of the bag top in the position which they occupy just prior to the action of the end-flap-folding mechanism; Fig. 10 is a side elevation, and Fig. 11 is a plan view of the entire machine, including the carton-filling, the bag-folding and the carton-sealing devices, arranged so as to advance the cartons therethrough in a straight line.

The machine as a whole is illustrated in Figs. 10 and 11, and consists of devices A for filling the cartons, mechanism B for compressing the material within the cartons, bag-folding devices C, and carton-sealing mechanism D, combined with a suitable conveyer or conveyers for feeding the cartons past the several sets of mechanism. As indicated above, the compressing devices and the bag-folding mechanism may be arranged in a straight line with the carton-filling mechanism and the carton-sealing mechanism, as is shown in Figs. 10 and 11, in which case a single conveyer is employed for advancing the cartons past the several sets of mechanism and devices. The invention is equally applicable, however, to a construction in which the several sets of mechanism are not arranged in a straight line, and in which the carton-filling mechanism is out of line or to one side of the compressing mechanism and the folding devices, which latter in turn are out of line with the carton-sealing mechanism. This is an arrangement which lends itself to certain conditions of floor space, and is desirable under certain other factory conditions, and in this case one conveyer may be employed to advance the cartons past the filling mechanism, after which the cartons are automatically shifted to a conveyer which advances them through the compressing and bag-folding mechanism, and after passing this mechanism they may be shifted thence to a conveyer which advances them past the sealing mechanism.

In their general features, the carton-filling and carton-sealing mechanisms may be of the usual or any suitable construction, and therefore need not be specifically described, and are only generally illustrated herein, except in regard to certain specific details which necessarily coöperate and co-act with the compressing devices and the bag-folding mechanism. I will now proceed to describe said compressing devices and folding mechanism.

Referring to the drawings, in which like reference numerals indicate like parts throughout the several views, the machine is supported on a suitable framework consisting of uprights 1 and horizontal bars 2, 2, suitably bolted or otherwise secured together. Power is supplied to the machine through a suitable sprocket chain 3 engaging a sprocket wheel 4, keyed to a horizontal shaft 5 mounted in suitable bearings in the framework. On the shaft 5 is a bevel gear 6 meshing with a bevel gear 7 on a counter-shaft 8, arranged in suitable bearings at one side of the machine, as clearly shown in Figs. 2ᵃ and 4. A bevel gear 9 on the counter-shaft 8 meshes with a like bevel gear 10 on a transverse shaft 11. Intermediate its ends this shaft 11 has keyed thereto a bevel gear 12 meshing with a bevel gear 13 on a longitudinally extending shaft 14, having bearings in suitable cross-bars arranged on the framework of the machine, and at its extreme left-hand end in Fig. 4, this shaft 14 has a bevel gear 15 keyed thereto, and meshing with a bevel gear 16 on a transverse shaft 18, also having bearings in the framework. At the extreme left-hand end of Fig. 4 is shown a transverse shaft 19 having thereon a sprocket wheel 20, over which passes sprocket chain 21, which at its other end passes around a sprocket wheel 22 (Fig. 1ᵃ) secured to the shaft 5. Sprocket chain 21 has secured thereto suitable carton followers 23 for advancing the cartons along a suitable track or way composed of two rails or bars 24, 24, shown in Figs. 3 and 3ᵃ.

Referring to Figs. 1 and 3, the filled cartons 25 are advanced from the carton-filling mechanism on a carrier belt 26 between guide rails 27, 27, and as they advance, the front carton engages a stop 28 (Figs. 3 and 6), a guide-plate or rod 29 (Fig. 3) being mounted on one of the guide rails 27 to insure that the cartons shall be advanced somewhat snugly against the other guide rail, in a position to be engaged by the stop, as will be readily understood from an inspection of Fig. 3. The cartons are freed one at a time from the stop 28, by means of a horizontally disposed rocking arm 30 mounted on a rock shaft 31, and having an upwardly projecting roller 32 for engaging the front part of the carton, and imparting a lateral thrust thereto to free it from the stop 28, and the carton is advanced by the movement of the belt 26, being shifted partially across the belt by coming in contact with a diagonally placed rail 33, until it abuts against a second stop in the form of a bar 34 extending above and across the belt 26. The carton is then shifted laterally from the belt 26 onto the two guide rails 24, 24, and in front of the followers 23, by means of a rotary shifting device in the form of a plate 35 secured by two links 36, 36', to two crank arms 37, 37', revolved by two shafts 38, 38'. The movements of the rocking arm 30 and of the shifting plate 35 are so timed that one carton at a time is shifted from the conveyer belt 26 onto the conveyer track 24, 24, just in advance of the conveyer followers 23 on the conveyer chain 21.

The rock shaft 31 and the revolving shafts 38, 38', are operated as follows: Referring to Figs. 3, 4 and 6, the transverse shaft 18 is connected by bevel gearing, shown in Fig. 4, to the shaft 38, on which is a gear 39 meshing with an intermediate gear 40, which in turn meshes with gear 41 on shaft 38', said intermediate gear 40 being keyed to a stub shaft 42. The rock shaft 31 is connected to shaft 30 by means of an eccentric link 43 pivotally connected to an arm 44 keyed to the shaft 31. The result of these connections is that the two shafts 38, 38' have one revolution imparted to them for each complete rocking movement forward and back of the rock shaft 31, and the rock arm 30 is so positioned on the rock shaft 31 as to cause it to free a carton from the stop 28 at the proper time to permit said carton to advance immediately after the shifting plate 35 has shifted a carton out of engagement with the stop 34, and onto the conveyer tracks 24, 24.

The carton having been shifted in front of the followers 23, is then advanced by said followers past the compressing mechanism, which acts, in case the material is piled up too high within the carton, to compress it therein below the scored line where the flaps join the carton walls. This carton-compressing mechanism will now be described.

The frame composed of two horizontal bars 45, 46, and end bars 47, 48, is mounted to reciprocate horizontally in suitable bearings 49 at one side of the framework of the machine. Keyed to the horizontal bars 45 and 46 are bearing brackets 50, four in number, as clearly shown in Fig. 7, and on these brackets are supported vertical bearings 51, within which a second frame is mounted to reciprocate vertically, said frame consisting of the two side bars 52, 53, connected by end bars 54, 55. The end bar 55 has a longitudinal slot 56 formed therein, and a vertical post 57 is adjustably mounted in said slot by means of the bolt 58 extending therethrough. Projecting from the upper end of the post 57, horizontally over the line of the advancing cartons, is a bar 59 from which depends a plunger 60, preferably tapered at its lower portion, as clearly shown in Fig. 7. When the horizontal frame is reciprocated, it moves the vertical frame horizontally back and forth, and as the vertical frame is carried by the horizontal frame and reciprocated up and down, it results that the plunger 60 has a movement imparted thereto which is the resultant of the movements of the two frames; that is, it has, first, a downward and backward movement, and then an upward and forward movement.

For the purpose of imparting movement to the horizontal frame, the shaft 18, which is driven from the shaft 14 through the bevel gears 15 and 16 (see Fig. 4), has on its outwardly projecting end a disk 61, provided with a pin 62, between the end bar 48 of the frame and a companion bar 63 (see Fig. 7), the pin 62 being eccentrically placed upon the disk 61. By reason of the pin 62 being engaged between the vertical bars 48 and 63, horizontal movements back and forth are imparted to the horizontal frame. Movements of the vertical frame on the horizontal frame are secured through a shaft 64 (Fig. 4) turning in suitable bearings on the framework of the machine, and having a bevel gear 65 on its inner end meshing with a bevel gear 66 keyed to the shaft 14, and having on its outer end a disk 67 provided with an eccentrically placed pin 68, engaging between two horizontal parallel bars 69 and 70 extending across the frame. The movements of the plunger 60 are so timed as to cause the plunger to enter the open mouth of the carton, and compress the same therein on each downward stroke of the plunger, and by reason of the adjustable mounting of the plunger, this exact timing of the plunger's movements, so as to cause it to enter the carton at the proper instant, is secured. The downward stroke of the plunger is so fixed as to cause it to compress the material within the carton to the level of, or just below the level of, the scoring on the carton at the top of its walls where the flaps join the carton, so that the latter as well as the paper-bag or lining, can be readily folded over the contents without interference therefrom. This downward compressing action of the plunger would have a tendency, in some cases, to cause the cartons to bulge at the sides, if means were not provided to prevent such bulging action. This bulging would result in tearing the flaps where the end portions of the flaps join the carton walls along the scored lines, and thus effectually destroying the package. This bulging action is prevented by the following means: As the plunger enters the carton, the latter is advanced by the followers 23 between a fixed guide rail 71 and a vertically disposed rocking rail 72 (see Figs. 3 and 3ª), and means are provided for forcing the hinged or rocking guide rail 72 firmly against the side of the carton, just as the plunger enters therein, and for holding it there during the downward stroke of the plunger. This hinged guide rail is illustrated in detail in Fig. 8, the rail being shown as firmly secured to two uprights 73, 73', hinged to the framework of the machine as at 74. Extending between the uprights 73 and 73' is a cross-bar 75, to which is pivotally connected a horizontally extending arm 76, which is rigidly connected to a vertical, downwardly extending arm 77, a suitable post 78, with a guide slot formed therein, being preferably employed to guide the movements of the arm 77. The two arms 77 and 76 in effect constitute a single rigid piece, and means are provided for rocking the two uprights 73, 73', and with them the guide rail 72, on the hinges 74, against the tension of a spring 79. Any suitable means may be employed for this purpose, and as here shown, they consist of a cam 80 (see Fig. 3ª) mounted on the shaft 8, said eccentric being also clearly shown in Fig. 4. As the plunger descends, the eccentric 80 forces the rail 72 against the side of the carton, so as to hold it with moderate firmness between said rail 72 and the guide rail 71, and yet without grasping it so firmly as to interfere with its free forward movement. As the plunger starts on its upward movement, the cam releases the guide rail 72, and the same is then thrown outward away from the carton by the action of the spring 79.

While the plunger is performing its functions, the side and end flaps of the carton are projecting upward above the top of the carton, as is also the top portion of the bag or liner, which top portion of the bag or liner must be folded in such position as to lie within the carton flaps when the same are folded and sealed. As the carton is advanced, the side flaps thereof are opened or folded outward and downward, by means which will now be described.

Referring to Figs. 1ª, 3ª and 5, 81, 81' are bracket arms extending outward from the frame of the machine above the line of travel of the cartons, and supporting a frame composed of two transverse bars 82, 82', suitably spaced as by spacing blocks 83, and united by bolts 84. Turning in bearings in said frame are two shafts 85, 86, provided with bevel gears 87, 88, on their upper ends, meshing respectively with bevel gears 89 and 90 on shaft 91, turning in bearings in the bracket arms 81, 81', which shaft is geared to a vertical shaft 92 through bevel gears 93 and 94. The shaft 92 turns in bearings in the side of the frame of the machine, and at its lower end is connected to the shaft 8 by bevel gearing 95 (Fig. 4). Shafts 85 and 86 have keyed to their lower ends two sleeves 96 and 97, from which project radial arms 98 and 99, and from these arms depend two vertical rods 100 and 101, whose lower portions 100' and 101' extend horizontally or at right angles to the vertical portions of said rods. These horizontally extending portions 100' and 101' are preferably slightly curved, as shown in Fig. 3ª, and the arrangement of the gearing is such that the two arms are revolved in opposite directions, and as the carton approaches these arms, their revolution is so timed that in their inward motion toward each other, they first strike the forward end flap of the carton, bending it slightly downward and entering between the side flaps 25' of the carton, as shown in Fig. 5, and open them outward, and continue to hold them open in this outward direction until they pass under downwardly curved rods 102, placed on either side of the path of the carton, which rods 102 act to turn the side flaps down approximately parallel with the side walls of the carton, and the carton is thus advanced with its side flaps turned down out of the way between the means provided for folding in the side portions of the bag or lining. These bag-folding devices consist of two plates 103 and 104 arranged to reciprocate horizontally across the top of the carton and from opposite sides, and one slightly in advance of the other. The construction of these folding devices is best shown in Figs. 1ª, 2ª and 3ª.

Projecting outwardly from the sides of the frame-work of the machine are brackets 105, on which are secured two horizontal, longitudinally extending bars 106, 106'. Projecting upwardly from these bars are posts 107 carrying longitudinally extending guide rods 108, 109. Mounted to reciprocate on and be guided by these guide rods is a plate 110 having on its under side bearings or eyes 111 (Fig. 1ª), which embrace the rods 109, leaving the plates 110 free to be reciprocated on said rods. Formed on the upper portion of the plate 110 are bearings or eyes 112 (Fig. 3ª), in which a frame is mounted to reciprocate transversely of the machine; that is, at right angles to the line of travel of the cartons. This frame is composed of two side bars 113, 113, connected at their ends by end bars 114, and the side bars 113 are mounted in the eyes or bearings 112 so as to reciprocate freely therein. It will thus be seen that the two frames 113—114 are mounted to reciprocate at right angles to the bars 109, and in mountings (the plates 110) which reciprocate longitudinally of said bars.

For the purpose of imparting to the parts the reciprocating movements referred to, two disks 115, 115', are mounted on opposite sides of the machine, one slightly in advance of the other, said disks being keyed to vertical shafts 116, 116'. Each of these disks has an eccentric wrist-pin 117, 117', respectively, and links 118, 118', connecting said wrist-pins with pivot pins 119, 119' on the respective plates 110. The links 118, 118' have longitudinal slots 120, 120' formed therein, through which slots pass stationary fulcrum pins 121, 121', projecting upward from one of the bars 105 on the machine, so that as the eccentric disks revolve, they not only impart a to-and-fro movement to the links 118, 118', but also impart a rocking movement to said links on their respective pivot pins. The to-and-fro movements reciprocate the plates 110 on the rods 109, and the rocking movements of the links reciprocate the frames 113—114 on the plates 110. Disk 115' is revolved directly from the shaft 8, through bevel gear 122 (Fig. 4), meshing with gear 123 on shaft 116', and the disk 115 is revolved by the shaft 11 through bevel gears 124 and 125 on the shaft 116.

Mounted on the inner ends of each of the frames 113—114 are two vertical rods 126, 127 (Fig. 1ª), which rods are preferably connected to the inner end bars of the frames by means of short horizontally extending pivoted links 128, shown in dotted lines in Fig. 3ª. By thus mounting these bars on pivotal links, the position of the vertical rods 126, 127, with relation to the frame, may be adjusted fore and aft of the machine, for a purpose which will hereinafter appear. Firmly secured to the upper ends of the rods 126 and 127 are the bag-folding plates 104 previously referred to.

The side flaps of the cartons having been opened by the revolving side-flap-openers 101—101', and turned downward by the rods 102, the bag or lining within the carton has its upper end on the side portions thereof exposed, and as the cartons pass the plates 103, 104, said plates are given a quick inward movement across the top of each carton, one operating an instant before the other, owing to the fact that one of the reciprocating plates 103, 104 is placed slightly in advance of the other. This acts to fold the side portions of the bag downward into the position indicated in Fig. 9, leaving the end portions thereof projecting upward approximately in the shape indicated in said figure. The parts are so timed as to have this inward thrust of the two plates occur at the proper instant, and the pivoted links 128 carrying the rods 126, 127, which support the plates 103, 104, assist in the accurate placing of the plates, so that they will act at the proper instant. The side portions of the bag or lining having been folded in, the carton is then advanced to a portion of the mechanism which performs the first step of the sealing operation, and at the same time folds inward the end portions of the bag or lining. This first step of the sealing operation consists in turning downward and inward the end flaps 129, 129' of the carton, and as these end flaps 129, 129' are turned inward in the first step of the sealing operation, they act to turn inward and downward the end portions 130, 130' of the bag, as will be readily understood from an inspection of Fig. 9. The end flap 129 is turned downward and inward, by being advanced in contact with and under a rearwardly and upwardly projecting plate 131 (Fig. 1ª), and the rear end flap is turned downward and inward by any suitable end-flap-folding device, one form of which will now be described.

Referring to Figs. 1ª and 2ª, 132 is a horizontal shaft mounted transversely of the machine in suitable bearings on the frame thereof, and provided with radial arms 133, here shown as four in number, which arms are provided with tucker plates 134 on their outward ends which, as the shaft 132 is revolved by a quick turning movement, cause the tucker plates to engage the rear face of the rear end flaps 129', and fold them quickly inward and downward. Shaft 132 is given an intermittent turning movement. This is accomplished through a shaft 135, shown in dotted lines in Fig. 1ª, operatively connected to shaft 132 by bevel gears 136 at its upper end, and at its lower end operatively connected to shaft 137 (Fig. 1ª) by means of bevel gears 138, best shown in Fig. 2ª. On the outer end of the shaft 137 is keyed a star wheel 139 (Fig. 1ª), provided with four equally spaced radial slots 140, the outer surface of the star wheel 139 being provided with concave surfaces 141 formed in the arc of a circle. 142 is a shaft mounted in bearings in the frame and having on its inner end a bevel gear 143 (Fig. 4) meshing with bevel gear 144 on the shaft 14. On the outer end of the shaft 142 is a circular disk 145 having a radius the same as that of the concave surface 141 on the star wheel 139, and so positioned with relation to the star wheel that the convex surface of the disk fits into the concave surface of the star wheel, as will be clearly understood from an inspection of Fig. 1ª. Securely bolted to the outer face of the disk 145 is a transverse bar 146, whose ends project outward beyond the circumference of the disk, and on each end of said disk is an inwardly projecting pin 147, so positioned that when the disk revolves the pins 147 will enter the slots 140 in the star wheel 139, imparting movement to the star wheel so long as the pins remain in and engage the wall of the slots, and as the pins emerge from the slots the star wheel comes to rest. The turning action of the star wheel 139 is permitted by reason of a V-shaped recess or cut-away 148, shown in dotted lines in Fig. 1ª, there being two of these recesses, one associated with each of the pins 147. When the pins 147 enter the slots 140 of the star wheel and start the turning action, they do so just as the cut-away portions 148 of the disk 145 are opposite the portions of the wheel adjacent the slots 140, and as the pins 147 leave the slots 140, the portions of the star wheel emerge from the cut-away or V-shaped portions of the disk, and the convex surface of the disk enters that concave surface 139 of the star wheel that is immediately opposite the disk, thereby serving to lock the star wheel, and therefore the shaft 132 and the tucker plates 134, in position until the next pin 147 enters a slot 140 on the star wheel, to give it its next turning movement. This insures a quick turning movement to the end-flap folder, and also insures its being at all times in precisely the proper position to act upon the rear end flap of the carton and fold it, as well as the end of the bag or lining, at the proper instant. The tucker plates 134 in their lowermost position serve to hold the rear end flaps downward until they are advanced from under the tucker plates to a position under the plate or bar 131, which bar preferably has a medial slot formed in its projecting end portion for the passage of the tucker bar on its upward movement.

The two end flaps are held in their folded position as they pass under the plate 131, and immediately upon emerging from under said plate they are given a firm pressure to force the end flaps well home in their folded position. This is accomplished by means of a revolving pressing or ironing part or member, shown in Fig. 1ª, in which 149 is a shaft mounted in suitable bearings and connected by bevel gears 150 and 151 to a shaft 152, whose lower end is geared to shaft 11 by bevel gears 153, 154. Keyed to shaft 149 is a radial arm 155 (Fig. 1ª) carrying a curved presser plate 156. As the carton passes under the shaft 149, the curved presser plate 156 descends upon the folded end flap near the front end of the carton, and as the carton advances and the presser plate is revolved, it brings pressure to bear across the top of the inturned end flaps, as will be readily understood from an inspection of Fig. 1ª. The flaps of the carton are then in the position shown in a plan view of the carton 157 (Fig. 3ª), with the end flaps folded in and the side flaps folded outward and approximately horizontal, in a position to receive the glue for sealing the carton, which is the second step in the sealing operation, the first step of the sealing operation being the folding of the side flaps outward and the end flaps inward, as has just been described. At this point the carton is advanced to the glue-applying rolls 158 (Figs. 10 and 11), to which rolls the glue is evenly distributed by glue-distributing rolls 159 dipping into a glue-containing receptacle 160, as is well understood in this art. After the glue is applied to the side flaps by the glue rolls 158, the side flaps are turned over by the flap-turning bars 161, 162 (Fig. 10), in a way common in the art, and the cartons are then passed under suitable rolls to retain them in position until the glue is set.

As the cartons pass from under the presser plate 156, they either proceed in a direct line to the other elements of the carton-sealing mechanism, as shown in Figs. 10 and 11 (as when all of the mechanisms are arranged in a right line), or in case the carton has been shifted out of line with the filling mechanism onto a side follower, as illustrated in Fig. 3, the carton after leaving the presser plate 156 may be again shifted onto the original follower 26. For this purpose the guide rails, operating in conjunction with the conveyer, are curved outward over the follower 26, as illustrated at 163 and 164 (Fig. 3ª), and as the carton is pushed along by the followers 23, it follows the guiding curve of the side rails, until its forward end is projected above and rests upon the carrier 26. The bottom portion of one side of the carton is guided in this turning movement by a bar 165 (Fig. 3ª) pivoted at 166 to the frame of the machine, and normally held in a position to be engaged by the lower forward corner of the carton by a spring 167, said spring holding the bar 165 over the slot through which the arms carrying the followers 123 project. When said arms, however, contact with the bar 165 as they advance from left to right in Fig. 3ª, the bar is forced outward against the spring 167, permitting the follower arms to pass, after which the spring immediately returns the bar 165 into position to assist again in guiding the carton in its turning movement. This action is sufficient to advance the carton far enough over the carrier 26 so that, by frictional contact, it picks up the carton and advances it until it is carried into the straight-away portion between the rails 163 and 164 and thus onward to the glue-applying rolls of the carton-sealing mechanism.

By means of the mechanism thus described, an empty carton may be placed in the machine, with a bag or other liner therein, or it may be placed in the machine, and the bag or liner afterward inserted therein, after which all of the operations of filling the carton, compressing the contents, folding the bag or liner thereover, and sealing the carton, are performed automatically. Moreover, if the arrangements of floor space in a factory are such that it is desired to extend the machine in one long straight line through the factory, this may be done, or if desired, the compressing mechanism, the bag-folding devices and the machines for folding out the side flaps and folding in the end flaps may be placed to one side of the direct line in which the bag-filling and the glue-applying and final side-flap-folding devices are located.

While for the purpose of giving a clear understanding of the invention, the same has been described with considerable particularity as to details of construction and arrangement of parts, it will be apparent that these may be varied within wide limits, without departure from the real spirit of the invention, and I wish it to be distinctly understood that the invention is not limited to such specific details and arrangement of parts, but that the invention is as broad as the terms of the claims hereto appended.

What is claimed is:—

1. In a machine of the character described, the combination of carton-filling mechanism, devices compacting the mass in the cartons, devices opening the side flaps of the cartons, bag-folding mechanism, carton-sealing mechanism, and means advancing the cartons past said devices and mechanisms.

2. In a machine of the character described, the combination of carton-filling mechanism, devices compressing the mass in the cartons, bag-folding mechanism, carton-sealing mechanism, and means advancing the cartons past said devices and mechanisms.

3. In a machine of the character described, the combination of carton filling mechanism, devices compacting the mass in the cartons, devices opening the side flaps of the cartons, devices folding in the sides of the carton lining, and means simultaneously folding in the carton end-flaps and the ends of the carton lining.

4. In a machine of the character described, the combination of means placing material in lined cartons, devices compressing the material in the cartons, devices folding in the sides of the carton lining, and means folding in the carton end-flaps and the ends of the carton lining.

5. In a machine of the character described, the combination of carton filling mechanism, devices compacting the mass in the cartons, devices opening the side flaps of the cartons, devices folding in the sides of the carton lining, means folding in the end flaps of the cartons and the ends of the carton lining, and means advancing the cartons in a right line past said mechanism means and devices.

6. In a machine of the character described, the combination of means advancing the carton, devices compressing the contents of the carton, and means supporting the sides of the carton against bulging action during such compression.

7. In a machine of the character described, the combination of a carton-guiding channel having an adjustable side wall, means advancing the cartons freely through said channel, devices compressing the contents of the carton, and means automatically forcing said adjustable wall against the carton during said compressive action, whereby said carton is supported against bulging when its contents are compressed.

8. In a machine of the character described, the combination of mechanism moving filled cartons through the machine, with means compacting the mass in the cartons while advancing therewith, whereby the mass is compacted in the carton without interrupting the forward movement of the carton.

9. In a machine of the character described, the combination of means opening the side flaps of the cartons, means folding the sides of the bag-lining, means simultaneously folding in the end flaps of the cartons and the end portions of the lining, means applying an adhesive to the opened side flaps, and means folding in the side flaps.

10. In a machine of the character described, the combination of a carton-guiding channel, and means advancing the cartons through said channel, with a plunger arranged above said channel, and means imparting to said plunger a rotary movement in a vertical plane.

11. In a machine of the character described, the combination of a carton-guiding channel, means advancing lined cartons through said channel, and a pair of revoluble devices entering between the side flaps of the cartons and the lining thereof and opening outward the side flaps.

12. In a machine of the character described, the combination of a carton-guiding channel, means advancing lined cartons through said channel, means opening the side flaps of the cartons, lining-folding devices located on opposite sides of said channel, and means reciprocating said folding devices to and fro across the upper portion of the carton whereby the side portions of the lining are folded inward.

13. In a device of the character described, the combination of a carton-guiding channel, means advancing lined cartons through said channel, means opening the side flaps of the cartons, lining-folding devices arranged on opposite sides of the channel, and means advancing said folding devices transversely across the upper portion of the carton and simultaneously advancing said devices in the direction of the line of movement of the cartons, whereby the side portions of the linings are folded inward.

14. In a machine of the character described, the combination of a carton-guiding channel, means advancing lined cartons through said channel, means opening the side flaps of the cartons, means retaining said flaps in their open position, means folding the side portions of the linings while the side flaps are opened outward, and means simultaneously folding the end flaps of the cartons and the end portions of the linings.

15. In a machine of the character described, the combination of a carton-guiding channel, means advancing lined cartons through said channel, means opening the side flaps of the cartons, devices retaining said flaps in their open position, lining-folding devices arranged on opposite sides of the channel, and means imparting to each of said folding devices a rotary movement in a horizontal plane extending over the upper portion of the carton, whereby the side portions of the lining are folded inward.

16. In a machine of the character described, the combination of a carton-guiding channel, means advancing lined cartons through said channel, side-flap-opening devices, means for folding inward the side portions of the linings of the cartons arranged on opposite sides of said channel, and devices imparting to each of said folding means a reciprocating movement transverse to said channel and a reciprocating movement parallel with said channel.

17. In a machine of the character described, the combination of a carton-guiding channel, means advancing lined cartons through said channel, means opening the side flaps of the cartons, means folding inward the side portions of the linings, revolving mechanism above the cartons folding in one of the end flaps, and stationary means above the carton folding in the other end flap.

18. In a machine of the character described, the combination of side-flap-opening devices, means for folding the side portions of a carton lining, means for simultaneously folding the end flaps of the cartons and the end portions of the lining, and mechanism advancing the cartons past said means and devices.

19. In a machine of the character described, the combination of means for opening the side flaps of the lined cartons, devices for folding in the side portions of the carton lining, means simultaneously folding in the end flaps of the cartons and the end portions of the lining, and revolving means for imparting downward pressure to said folded end flaps and folded lining.

In testimony whereof I have signed this specification in the presence of two subscribing witnesses.

FRANK B. MARTIN.

Witnesses:
 WINOLA J. COOPER,
 VERN D. SUTTON.